United States Patent [19]
Fontein

[11] 3,805,401
[45] Apr. 23, 1974

[54] PROCESS AND APPARATUS FOR REMOVING LIQUID FROM WET OR MOIST PARTICLES

[75] Inventor: Freerk J. Fontein, Heerlen, Netherlands

[73] Assignee: Stamicarbon N.V., Heerlen, Netherlands

[22] Filed: July 3, 1972

[21] Appl. No.: 268,583

[30] Foreign Application Priority Data
July 3, 1971   Netherlands ...................... 7109221

[52] U.S. Cl. .......................................... 34/10, 34/58
[51] Int. Cl. .............................................. F26b 3/10
[58] Field of Search .................... 34/8, 10, 57 E, 58

[56] References Cited
UNITED STATES PATENTS 3,045,359   7/1962   Billingsley ........................ 34/10 X
3,518,772   7/1970   Barr ....................................... 34/10
1,880,273   10/1932   Pardee et al. .......................... 34/58

*Primary Examiner*—William F. O'Dea
*Assistant Examiner*—William C. Anderson
*Attorney, Agent, or Firm*—Cushman, Darby & Cushman

[57] ABSTRACT

Process and apparatus for removing liquid from wet or moist thermoplastic particles, wherein the material, which may be in granular or powdery form, is introduced into a gas stream which blows it at a high velocity in a substantially tangential direction against a curved wall provided with apertures. The thermoplastic particles repeatedly impinge on and rebounce from the curved wall and as a result the liquid is flung off. The liquid is carried away by the gas stream through the apertures in the curved wall, the thermoplastic particles are separately collected and discharged at the downstream end of the curved wall.

17 Claims, 3 Drawing Figures

3,805,401

PROCESS AND APPARATUS FOR REMOVING LIQUID FROM WET OR MOIST PARTICLES

The invention relates to a process for removing liquid from wet or moist thermoplastic particles.

BACKGROUND OF THE INVENTION

As is well known wet powdery thermoplastic produces can be dried with the aid of centrifuges. In these centrifuges the free liquid supplied along with the product is indeed flung off the plastics particles, but since the particles have a large surface in relation to the volume an appreciable quantity of moisture keeps adhering to them. As a result the product leaving the centrifuge usually has a moisture content of 15–20 percent, and sometimes of up to 30 percent if the product has a porous structure, so that it is necessary for the product to be subjected to thermal-drying treatment in order to reduce the moisture content to below the required value of at most a few hundredths of a percent by weight.

Also the drying of coarser granules, for instance granules obtained by under-water granulation of thermoplastic materials, is as a rule effected by mechanical treatment, followed by, or combined with, thermal treatment. For the mechanical removal of the liquid carried along with the granules, vibrating screens and similar devices are frequently applied. Subsequently, the quantity of moisture left behind after said removal and adhering to the granules, which quantity amounts to only about 2 percent as a result of the more favourable surface to volume ratio of the granules, is still to be removed by thermal drying or by centrifugation. Thermal drying may be realized in a separate step, but may also be effected during the screening operation, for instance by passing hot air over the screen deck.

Another process for drying granulate materials is described in U.S. Pat. No. 3,469,323. In this process the bulk of the water is removed from the plastics granulate by means of a sieve bend and the dewatered overflow product from this sieve bend is introduced into a fluid-bed drier.

The apparatus for carrying out these known processes calls for comparatively high investments as the required equipment is expensive and as, in case centrifuges or vibrating screens are used heavy foundations are necessary. Also the costs of operation are high, which partly results from the intensive maintenance work required and partly from the high cost of thermal energy required for heating the drying air.

It is also known for granular and fibrous products to be dried to be introduced into a stream of heated gas which is led into a separating device. In processes of this kind the actual drying is effected in the gas stream and after the drying step has substantially been completed the dried product is mechanically separated from the drying gas which has taken up the moisture. The drying being entirely effected by thermal energy this type of process is also expensive.

Further, when using the above processes for the drying of certain products such as polyethylene, only a moderate maximum temperature is allowable in thermal drying in view of the risk of softening and caking of the particles or of essential changes in the chemical or physical properties. The gradual supply of heat necessary because of this calls for a long residence time of the product in the thermal drying device and, hence, for a large thermal drying capacity.

The invention aims at providing a process for removing liquid from wet or moist particles, wherein the abovementioned drawbacks of the known processes have been eliminated to a substantial degree. A further object of the invention is to provide an apparatus for carrying out this process.

SUMMARY OF THE INVENTION

According to the invention the material to be treated is accelerated by introducing it into a gas stream of at least 20 meters per second and the resulting particle laden gas stream is blown against a perforated curved wall in a substantially tangential direction. The particles impinge against this curved wall, bounce away therefrom and leave the gas stream. Due to the acceleration and the impinging against the curved wall the adhering liquid is flung off the particles and carried away with the gas stream. The treated particles are separately collected and discharged and the gas stream, which has taken up the liquid, passes through the apertures in the curved wall and is also discharged.

When granular materials are to be treated the curved wall may be composed of spaced parallel bars disposed with their longitudinal axis perpendicular to the direction of flow of the gas stream.

Further, according to the invention powdery materials which are dispersed in a liquid may be treated by introducing the mixture of particles and liquid in a gas stream and feeding the resulting gas-liquid-particles mixture to a curved wall having slit-like apertures which are perpendicular to the direction of flow. The dimension of these slit-like apertures in the direction of flow may be two to five times the largest dimension of the particles to be treated.

BRIEF DESCRIPTION OF THE DRAWINGS

The invention will be further elucidated with reference to the drawing.

DESCRIPTION OF THE PREFERRED EMBODIMENTS

Figure 1:
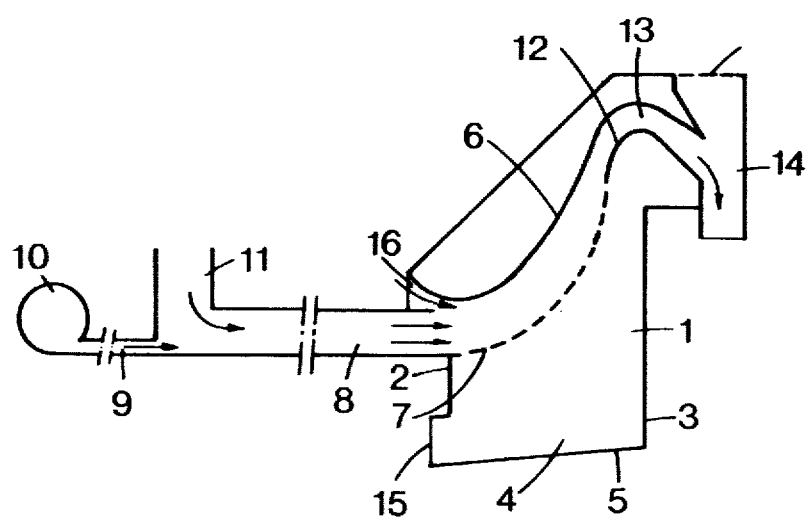
FIG. 1 schematically shows an apparatus for removing liquid from moist granular particles by the process according to the invention.

Referring now more particularly to the drawings, there is shown in FIG. 1 one embodiment of an apparatus for carrying out the process according to the present invention in which a housing 1 has a front wall 2, a back wall 3, side walls 4, a bottom portion 5 and a cover plate 6. In housing 1 a curved partition wall 7 is mounted, in which a number of slit-like apertures have been provided. The apertures are disposed with their longitudinal axis parallel to the generatrix of the plane of curvature of curved wall 7. In a typical embodiment curved wall 7 is composed of spaced parallel bars. A feed duct 8 substantially tangentially connects with curved wall 7. The front portion of feed duct 8 consists of a portion 9 of smaller cross sectional area which is connected to the delivery side of the fan 10. At the point where the narrow section 9 changes into the wider section of feed duct 8, an inlet aperture 11 is provided for the introduction of the particular material to be treated. In the bottom of the feed duct 8 apertures may be provided at some distance from each other.

The upper end of the cover plate 6 runs parallel with closed upper section 12 of the curved wall 7 and forms with this section and with the side walls of the housing a discharge channel 13, which ends in a discharge duct 14. The part of the housing located below curved wall 7 is provided with an outlet aperture 15. The lower part of cover plate 6 is shaped so that above the output aperture of feed duct 8 there is an aperture 16 through which the space between curved wall 7 and cover plate 6 is in free communication with the ambient atmosphere.

The apparatus according to FIG. 1 operates as follows. A carrier gas, which, for instance may be air, is blown into the narrow section 9 of feed duct 8 by fan 10. The gas stream takes up the wet granules supplied through the aperture 11, the granules being subject to such acceleration that part of the liquid adhering thereto becomes detached from the granules and is partly entrained by the carrier gas and partly deposits on the walls of feed duct 8. Under the influence of the flowing gas stream, this liquid flows to the outlet side of the feed channel or leaves the feed channel, possibly through the previously mentioned apertures in the bottom portion thereof. When the carrier gas is introduced into the feed duct 8 its velocity decreases as a result of the increase of the diameter of the feed duct. The velocity of the gas stream in feed duct 8 should not be less than 20 meters per second and preferably be more than 30 meters per second. The granules retain their high speeds, however, because of their inertia and, after having left the feed duct, impinge on the dams of curved wall 7. In this way they are given a rotating movement, in which they spin around their centre of gravity, whilst, at the same time, the impingement causes the direction of their, mainly rectilinear, movement to be suddenly changed.

During their passage between curved wall 7 and cover plate 6 the granules rebound several times and move in an upward direction into discharge channel 13 and subsequently leave the apparatus through discharge duct 14, which is open at the upper side to achieve pressure equalization. The rotation and the sudden change of the direction of the movement cause practically all of the moisture still adhering to the granules to be flung off. This moisture is taken up by the gas stream which does generally not adopt the changed direction of the granules, but passes through the apertures in the curved wall 7 and is discharged through outlet aperture 15. Air is aspirated through aperture 16 so that the carrier gas which has taken up the liquid is prevented from following curved wall 7.

If the granules leaving the apparatus still contain too much moisture, the treatment can be repeated. Thus the pneumatic drying devices required for this purpose may be connected in a cascade arrangement, as shown in FIG. 2, in which figure also a device is shown in which the product is pretreated.

Figure 2:
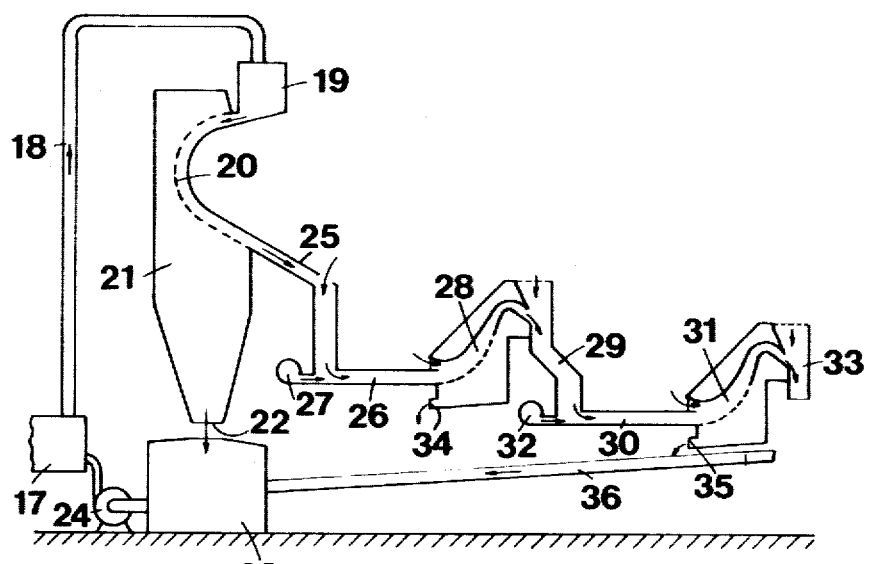
FIG. 2 schematically shows another embodiment of an apparatus in which the process of the invention can also be applied to granular materials.

Referring to FIG. 2, 17 is a so-called wet-granulation device of polyethylene, from which the granules are carried along by water through line 18, to the feed tray 19 of a sieve bend 20. Under the influence of pressure and gravity the mixture of polyethylene granules and water flows to the curved screen deck, on which the major portion of the water is separated off, and subsequently reaches collecting chamber 21 through the slots in the screen deck. From the chamber 21 it flows through outlet aperture 22 into pump reservoir 23 and is recycled to granulator 17 by pump 24. If necessary the fine particles carried along by the liquid are separated off first.

The overflow product of sieve bend 20, consisting of polyethylene granules and a small quantity of mainly adherent water, drops through duct 25 into feed channel 26, where a velocity is imparted thereto by forced air supplied by fan 27 so that in separating device 28, as large as possible a portion of the water still associated with the granules is separated off in the manner described with reference to FIG. 1.

In order for the moisture content of the granules to be reduced below the allowable maximum, the discharge duct 29 of separating device 28 is connected to feed channel 30 of separating device 31, which channel is supplied with air by fan 32. The operation of separating device 31 is identical with that of separating device 28. The product leaving the installation through discharge duct 33 is suitable, possibly after a sizing operation on screens, for subsequent treatment or to be packed for subsequent processing elsewhere.

The water separated off in separating devices 28 and 31 flows, through the outlet apertures 34 and 35, into a collecting chute 36 and is discharged or recycled to the granulating installation. The air which has been used and separated off again can freely issue into the surroundings.

Figure 3:
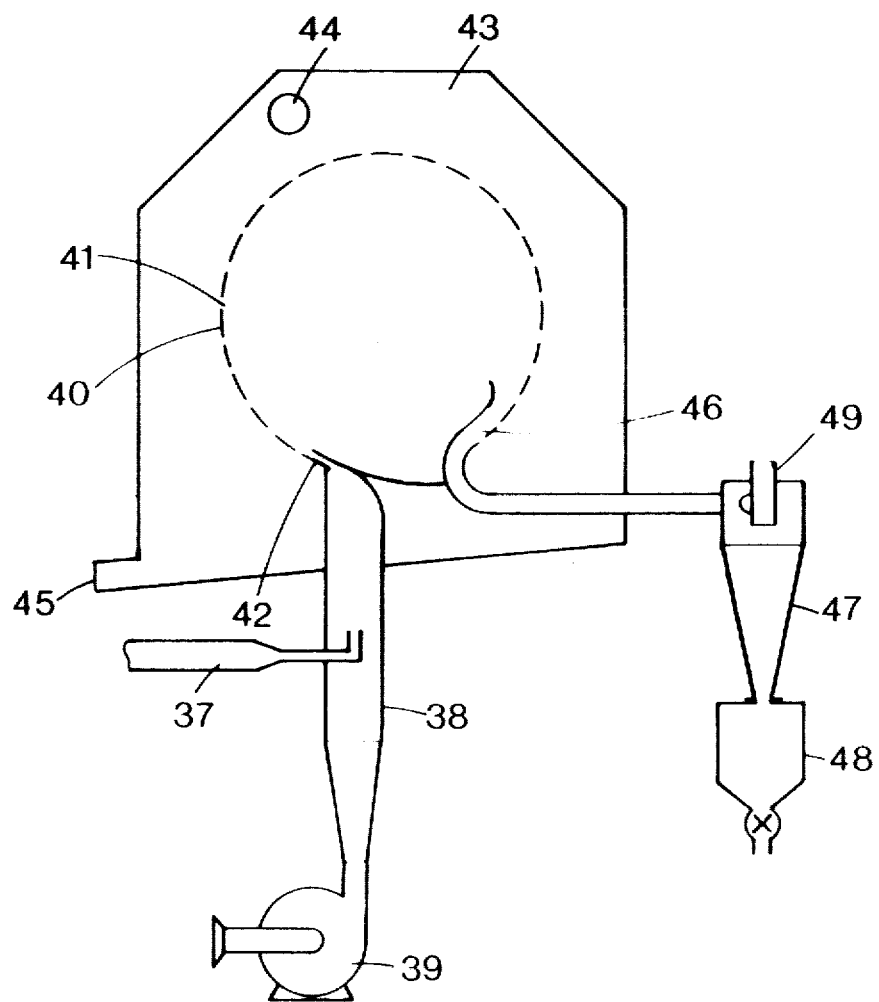
FIG. 3 schematically shows an apparatus for removing liquid from a mixture of powdery materials and liquid by the process according to the invention.

In principle, for separating the liquid from a wet, powdery particulate material use can also be made of the apparatus hereinbefore described. However, with such products the process according to the invention can be carried out to advantage in an apparatus as shown in FIG. 3, wherein the material to be treated, which may contain a substantial quantity of free liquid, is also accelerated by means of a gas stream, the material being blown with a high speed against a curved wall containing apertures. Thus, for example an aqueous slurry of polyethylene powder is introduced through line 37 provided with a nozzle into feed duct 38, through which is passed at a high velocity gas supplied by fan 39. The mixture of solid particles, liquid and gas thus formed is sprayed, substantially tangentially, along the feed side of the curved wall 40 provided with apertures 41 through spray nozzle 42 installed at the end of the feed channel 38. As hereinbefore described with reference to FIG. 1, during this procedure the solid particles impinge on the solid parts of the wall, rebound and rapidly spin around their centre of gravity. They jump out of the layer moving along the wall, the liquid adhering to their surface being flung off. The liquid and the gas follow the surface of the solid parts between the apertures 41 in wall 40, and enter collecting chamber 43 through the said apertures. The gas containing extremely small liquid particles is discharged from the chamber through aperture 44, whilst the liquid leaves through aperture 45. The liquid particles impinge on the wall a number of times, rebound therefrom and at the end of the wall enter discharge channel 46 together with part of the gas still present, the discharge channel ending in the solids-gas separator 47, which in the drawing is a cyclone, though other types of separator may be used. The powder caught in separator 47 is collected in chamber 48, whilst the gas leaves the separator through gas discharge pipe 49. The space inside wall 40 communicates with the atmosphere in order to avoid the occurrence of a vacuum, which would adversely affect performance.

The dimensions of the apertures in curved wall 7 of the device according to FIG. 1 and curved wall 40 in the device according to FIG. 3 need not necessarily be smaller than those of the solid particles of the material to be treated, and may for example be two to five times larger than the largest of the solid particles. Since the tangential velocity of the solid particles with respect to the curved wall is large, only very fine particles, if any, having dimensions substantially smaller than that of the apertures in the direction of flow, will pass through the apertures. Hence, there is no risk of the apertures becoming clogged, which is an important advantage compared with processes in which the product to be dried is treated on screens. The dimensions of the apertures in the direction which is normal to the direction in which the material moves do not influence on the performance of the apparatus. For this reason the curved wall preferably consists of profiled bars installed in parallel, the use of bars making it possible to use curved walls with slots of a small width, e.g. less than 0.1 mm, for treating very fine, powdery substances.

When wet powdery substances are to be treated it is particularly advantageous to use steam as a carrier gas. The steam heats the particles by transfer of sensible heat and heat of condensation, with the result that the surface tension between the particles and water decreases and adhering water is more easily released. Moreover, the effective mass of the particles is increased by the condensation of steam on their surface thus increasing their momentum.

EXAMPLE 1

In the installation shown by FIG. 2 two tests, viz. 1 a and 1 b, were conducted with polyethylene granules of average diameter 3 mm.

The operating data and results are set forth in Table 1, the reference numerals being as indicated in FIG. 2.

TABLE 1

|  | Run 1a | Run 1b |
|---|---|---|
| Granulate temperature | 40 °C | 95 °C |
| Granulate quantity | 2000 kg/hour | 1000 kg/hour |
| Feed concentration of wet granulate | 60 kg/m³ of water | 20 kg/m³ of water |
| Dewatering sieve bend 20: | | |
| width | 300 mm | 235 mm |
| effective length | 1600 mm | 800 mm |
| slot width | 1.4 mm | 1.4 mm |
| bar width | 1 mm | 1 mm |
| temperature overflow sieve bend | 40 °C | 95 °C |
| moisture content overflow sieve bend | 2 % | 2.4 % |
| Separators 28 and 31: | | |
| curved wall: width | 160 mm | 75 mm |
| effective length | 800 mm | 800 mm |
| slot width | 1.4 mm | 1.4 mm |
| bar width | 1.8 mm | 0.4 mm |
| air : initial velocity | 80 m/sec. | 100 m/sec. |
| temperature | 30 °C | 10 °C |
| quantity | 2 × 1400 Nm³/hour | 2 × 700 Nm³/hour |
| Moisture content of granulate in duct 29 | 0.07 % | 0.01 % |
| Moisture content of granulate in duct 33 | 0.02 % | 0.01 % |
| Time required for complete treatment | <1 sec. | <1 sec. |

EXAMPLE 2

In three runs 2 a, 2 b and 2 c, a slurry of polyethylene powder in water was treated in the apparatus according to FIG. 3. In the runs 2 a and 2 b the slurry was supplied to the curved wall 40 through a slot 42 whilst in run 2 c a plurality of small tubes placed side by side were used in the apparatus instead of the said slot 42.

The polyethylene powder did not contain any particles of diameter greater than 200 microns, some 10 percent being smaller than 50 microns.

The curved wall 40 was identical in the three runs and had the following dimensions:
width — 200 mm
effective length — 788 mm
slot width — 50 microns
bar width — 1 mm
radius — 150 mm
subtended angle — 300°
diameter of feed channel — 50 mm The operating data and results of the said runs are set forth in Table 2.

TABLE 2

|  | Run 2 a | Run 2 b | Run 2 c |
|---|---|---|---|
| feed slot | 200 × 3 mm | 200 × 3 mm |  |
| feed tubes |  |  | 8 of 10 mm in diameter |
| the feed contained: | | | |
| polyethylene | 125 kg/hour | 160 kg/hour | 200 kg/hour |
| water | 300 kg/hour | 300 kg/hour | 400 kg/hour |
| air | 700 kg/hour | 700 kg/hour | 700 kg/hour |
| air, temperature | 20 °C | 20 °C | 20 °C |
| pressure | 0.75 atmosphere g | 0.75 atmosphere g | 1 atmosphere g |
| final moisture content | 10 % | 14.5 % | 11.5 % |

The results of runs 2 a and 2 b show that an increase in the concentration of polyethylene powder in the feed results in a higher percentage of moisture in the product treated.

Run 2 c indicated that a comparable moisture content can be obtained when using a plurality of small feed pipes instead of a feed slot at a feed concentration and a feed capacity which are substantially higher due to an improved distribution across the width of the wall 40 of the gas-liquid-powder mixture.

What is claimed is:

1. A process for removing liquid from wet or moist thermoplastic particles, said process comprising the steps of:

a. accelerating said particles by introducing them into a gas stream having a velocity of at least 20 meters per second, b. impinging the particles against a curved wall which is provided with apertures by blowing the particle-ladened gas stream in a substantially tangential direction against said curved wall, to suddenly change the direction of movement of the particles, whereby the particles bounce off said wall and leave the main gas stream, c. separately collecting and discharging the particles which have left the main gas stream, and d. discharging through said apertures the bulk of the gas stream and the separated liquid.

2. The process of claim 1, wherein granular materials are treated by blowing the particle laden gas stream against a curved wall which consists of spaced bars disposed with their longitudinal axis perpendicular to the direction of flow of the gas stream.

3. The process of claim 1, wherein powdery materials dispersed in a liquid are treated by accelerating the mixture of particles and liquid with the aid of the gas and the gas-liquid-particles mixture is fed to a curved wall having slit-like apertures disposed with their longitudinal axis perpendicular to the direction of flow, the dimension of said apertures in the direction of flow being two to five times as large as the largest dimension of the particles to be treated.

4. The process if claim 1, therein the gas is air.

5. The process of claim 1, wherein the gas is steam.

6. The process of claim 1, wherein the thermoplastic particles are polyethylene.

7. Process according to claim 6, wherein said liquid is water.

8. Process of claim 1, wherein the gas stream into which the particles are introduced has a velocity of at least 30 meters per second.

9. Process according to claim 1, wherein the apertures are from about 44 to about 64 percent of the area of said curved wall.

10. Apparatus for removing liquid from wet or moist thermoplastic particles, comprising housing means, curved partition wall means within said housing means and having a concave side and a convex side, including apertures in the wall for passage of the bulk of a gas stream and said liquid therethrough, a duct substantially tangentially connected to the concave side of the curved partition wall means, a first inlet opening means in said duct for introducing a gas at a velocity of at least 20 meters per second, a second inlet opening means downstream of said first inlet opening means for introducing said wet or moist thermoplastic particles into the gas stream, outlet opening means in said housing means for the removal of treated thermoplastic particles at the end of the curved partition wall means opposite said duct and at a concave side of said curved partition wall means, and outlet opening means for the bulk of said gas stream and said liquid at the convex side of the curved partition wall means.

11. Apparatus according to claim 10, wherein said apertures are slit-like apertures disposed with their longitudinal axis parallel to the generatrix of the plane of curvature of said curved partition wall means.

12. Apparatus of claim 10, wherein the area of said apertures is about 44 — about 64 percent of the area of said curved partition wall means.

13. Apparatus according to claim 10, wherein the dimension of said apertures in the direction of flow of material is about 2 to about 5 times as large as the largest dimension of said thermoplastic particles.

14. The apparatus of claim 10, wherein the curved partition wall means consists of spaced bars running parallel to the generatrix of the plane of curvature of said curved partition wall means.

15. Apparatus according to claim 14, wherein the slots between said spaced bars are less than 0.1 mm in width.

16. The apparatus of claim 10, wherein the second inlet opening means in said duct is in receiving connection with the discharge end of a dewatering sieve bend.

17. The apparatus of claim 16, wherein the subtended angle of the curved partition wall means is at least 270°.

* * * * *

UNITED STATES PATENT OFFICE
CERTIFICATE OF CORRECTION

Patent No. 3,805,401      Dated April 23, 1974

Inventor(s) Freerk J. Fontein

It is certified that error appears in the above-identified patent and that said Letters Patent are hereby corrected as shown below:

Column 8, line 29, in claim 17, "The apparatus of claim 16" should read --The apparatus of claim 10--.

Signed and Sealed this twenty-third Day of December 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,805,401                    Dated April 23, 1974

Inventor(s) Freerk J. Fontein

It is certified that error appears in the above-identified patent and that said Letters Patent are hereby corrected as shown below:

Column 7, line 6, "therein the gas is air" should read --wherein the gas is air--.

Signed and Sealed this third Day of February 1976

[SEAL]

Attest:

RUTH C. MASON
Attesting Officer

C. MARSHALL DANN
Commissioner of Patents and Trademarks